Patented Oct. 2, 1934

1,975,084

UNITED STATES PATENT OFFICE 1,975,084

COMPOSITION OF MATTER AND PROCESS OF TREATING MOLTEN METALS

Alfred H. Davies, deceased, late of New York, N. Y., by Edith Vail Davies, executrix, New York, N. Y.

No Drawing. Application March 7, 1932, Serial No. 597,414

19 Claims. (Cl. 75—17)

The present invention relates to a new composition of matter for and a method of treating metals when in molten condition. One object thereof has been to provide a composition or combination of substances which when used in connection with or introduced according to the method into a mass of molten metal, more particularly of non-ferrous character, in predetermined quantities and under proper conditions will produce an ultimate metal product of definitely superior character and quality. For example, when the improved composition is used in producing, refining or treating copper, brass, bronze, nickel, aluminum or other non-ferrous metals and/or alloys thereof, the resulting metal possesses a novel and highly beneficial even distribution of all its elements and the amalgamation thereof in a substantially homogeneous mass. A very active beneficial effect accompanies the use of the improved composition which operates in part as a scavenging agent to eliminate or reduce the undesirable gases, impurities and imperfections commonly encountered in commercial metals.

What has been referred to as the beneficial effect is in the inventor's opinion produced in part by the combined action of potassium chlorate and manganese dioxide, while the scavenging effect is produced in part by borax or boracic acid and/or calcium fluoride. In a preferred composition for the treatment of certain non-ferrous metals as copper, brass, bronze, nickel, etc., or alloys containing the same in predominating proportions, a mixture of the above ingredients and others in the following proportions is used:

| | Pounds |
|---|---|
| Potassium chlorate | 2 to 4 |
| Manganese dioxide | 2 to 3 |
| Borax and/or boracic acid | 2 to 4 |
| Calcium fluoride | 1 to 2 |
| Zinc | 1 |
| Manganese | 1 to 2 |
| Iron ore (hematite) | 2 |
| Dolomite | 2 |
| Coal | 2 |
| Charcoal | 2 |

This improved composition of matter is used in the proportion of from 1 lb. to 3 lbs. per 100 lbs. of metal, approximately ½ of each indicated charge being introduced with the ore, scrap, or other raw material in the crucible or furnace before melting and the remainder of the indicated charge being introduced therein before pouring and while the content of the crucible or furnace is in molten condition. Effective treatment may also be given by introducing the composition into the molten metal in the ladle either with or without prior treatment thereof in the furnace crucible or otherwise.

For the treatment of aluminum and/or aluminum alloys where aluminum predominates, the foregoing mixture is varied by adding thereto soda ash and/or sodium fluoride in the amount of 1 to 2 lbs. along with a small quantity of magnesium. For example, in treating aluminum alloy of 92 parts aluminum and 8 parts copper, ¼ to 1 oz. of magnesium is added to the charge required for treating 100 lbs., said charge also including 1 to 2 lbs. of soda ash and/or sodium fluoride. This aluminum alloy treated as above indicated showed as cast and without further heating treatment, the following improved characteristics as compared to an untreated metal of the same composition: a finer grain structure; an increase of from 5 to 20% in tensile strength; an increase of 50% in elongation in 2 inches; and an increase of from 5 to 20% in yield point load in pounds per square inch.

Where the non-ferrous metals or alloys thereof are combined with well-known or other alloying metals as chromium, tungsten, magnesium, cobalt, and/or others, some advantage in the operation of the method is observed where the treating or purifying charge as above set forth also includes a very small amount of each of the alloying metals. A trace of such additional metal being sufficient in most instances and the amount being such that it would not materially affect the ultimate composition of the alloy as regards its metal content. Thus, where chromium and tungsten are included in small amounts for certain purposes in an alloy of copper, in treating 100 lbs. of such metal according to the method, less than ½ an ounce of chromium and less than ½ an ounce of tungsten are added to the composition or mixture with which treatment is effected. The addition of traces of certain of the alloying components of an alloy of non-ferrous metals in the composition or charge for treating said alloys appears to have the effect of expediting the initial effective operation of the composition. In other respects, the use of the composition alone without the traces of said alloying metals produces the characteristic intended results in the product.

In preparing the composition of matter for commercial use, it is preferred to reduce the ingredients while in a dry state substantially to a powder of the fineness of 120 mesh. It is not essential that so fine a reduction be effected, but the action of the composition is more rapid and more widely distributed where the particles thereof are reduced to a relatively minute size. The charge can be administered in powdered form or in any other desired or convenient form, such as briquettes, packages or otherwise. However, it is preferred to package predetermined amounts of the mixture in suitable containers such as metallic capsules, cans or cartridges, or in bags or cartons of paper or cloth to which a coating of paraffin or other moisture-resisting material is applied on the outer surface thereof. This tends to retain the powdered materials in practically dry condition and protects them from accidental wetting such as might easily take place in and about a large manufacturing plant or in transportation.

The composition may be introduced into the molten mass in various ways with favorable results. It is preferred, however, in large operations to confine appropriate quantities of composition in metallic containers or capsules which may be of suitable material, depending on the metal product desired. To treat a mass of molten brass, for example, in the crucible, a charge-carrying brass capsule is pressed down through the mass to an underlying or bottom portion thereof and hold it there until the capsule disintegrates or is about to disintegrate. Thereupon the active charge is released into the metal. Important results are observed even where the composition is introduced by different methods as by dumping or depositing in loose form into the molten mass, or throwing it into the metal in the form of packages or briquettes. In cases where a charge is confined in a capsule or the like, it will be understood that the material and dimensions of the capsule will be such that the walls or some locking or releasable confining part thereof will be acted upon by the molten metal to release the reagent after a predetermined time of exposure to or in the molten mass.

From the foregoing description, it will be apparent that no unusual technical difficulties are involved in the use of the improved composition. Metals produced by methods which utilize this composition present a number of distinguishing and advantageous properties and characteristics over products of normal contemporary manufacturing practice. With the use of the invention these products are substantially free from occluded gases, free oxides, slags, segregations, piping porosity and blow holes; and display a homogeneous, small close grain texture. As the result of the use of the composition and method, the metal product, as cast and without additional heat treatment exhibits marked increase in tensile strength and ductility, finer grain and less segregations at the grain boundaries, as compared to untreated matters and/or alloys of the same composition. Other valuable and important advantages result directly or indirectly from the use of the composition either by reason of the characteristics of the improved metals produced, the simplification of the operations in their production, or both.

What is claimed as the invention is:

1. A composition of matter for use in metallurgical operations comprising substantially equal parts of an alkali metal chlorate, manganese dioxide, a boron compound, calcium fluoride, zinc, manganese, hematite, dolomite, and a carbonaceous substance.

2. A compoistion of matter for use in the treatment of molten metals comprising substantially equal parts of an alkali metal chlorate, manganese dioxide, a scavenging agent including calcium fluoride, and zinc, manganese, hematite, dolomite, and a carbonaceous substance.

3. A composition of matter for use in metallurgical operations comprising potassium chlorate, manganese dioxide, a boron compound, calcium fluoride, zinc, manganese, hematite, dolomite and free carbon all in substantially equal proportions.

4. A composition of matter for use in metallurgical operations comprising potassium chlorate, manganese dioxide, borax, calcium fluoride, zinc, manganese, hematite, dolomite, coal and charcoal all in substantially equal proportions.

5. A composition of matter for use in metallurgical operations comprising potassium chlorate, boracic acid, calcium fluoride, manganese dioxide, manganese, hematite, dolomite, coal and charcoal all in substantially equal proportions.

6. A composition of matter for use in metallurgical operations comprising approximately 8 to 16 parts of potassium chlorate, 8–12 parts of manganese dioxide, 8 to 16 parts of borax, 4 to 8 parts of calcium fluoride, 4 parts of zinc, 4 to 8 parts of manganese, 8 parts of hematite, 8 parts of dolomite, 8 parts of coal and 8 parts of charcoal.

7. A composition of matter for use in metallurgical operations comprising 8 to 16 parts of potassium chlorate, 8 to 12 parts of manganese dioxide, 8 to 16 parts of boracic acid, 4 to 8 parts calcium fluoride, 4 parts of zinc, 4 to 8 parts of manganese, 8 parts of hematite, 8 parts of dolomite, 8 parts of coal and 8 parts of charcoal.

8. A composition of matter for use in the treatment of molten metals comprising substantially equal parts of a concentrated deoxidizing agent in intimate admixture with borax, calcium fluoride, zinc, manganese, hematite, dolomite, and free carbon.

9. The process of treating molten metals including subjecting the molten metal to the action of a mixture of an oxygen liberating agent, a boron compound, calcium fluoride, zinc, manganese, iron oxide, dolomite, coal and charcoal all in substantially equal proportions.

10. The process of treating molten metals including subjecting the molten metal to the action of a mixture of potassium chlorate, manganese dioxide, a boron compound, calcium fluoride, zinc, manganese, iron oxide, dolomite, coal, and charcoal all in substantially equal proportions.

11. The process as in claim 9 wherein the molten metal is a non-ferrous metal.

12. The process as in claim 10 wherein the molten metal is a non-ferrous metal.

13. The process of treating molten metals including subjecting the molten metal to the action of a mixture of an alkali metal chlorate, manganese dioxide, a scavenging agent including a boron compound and calcium fluoride, and zinc, manganese, iron oxide, dolomite, coal, and charcoal all in substantially equal proportions.

14. The process of treating molten metals including subjecting the molten metal to the action of a mixture of an alkali metal chlorate, manganese dioxide, a boron compound, calcium fluoride, zinc, manganese, iron oxide, dolomite, coal and charcoal all in substantially equal porportions.

15. The process as in claim 13 wherein the molten metal is a non-ferrous metal.

16. The process as in claim 14 wherein the molten metal is a non-ferrous metal.

17. The process of treating molten metals as claimed in claim 9 and wherein the molten metal is an alloy in which aluminum predominates and the mixture includes magnesium and a sodium compound.

18. The process of treating molten metals as claimed in claim 9 and wherein the molten metal is an alloy in which a non-ferrous metal predominates and the mixture includes a trace of each metal in said alloy other than the predominating metal thereof.

19. The process of treating molten metals as claimed in claim 9 and wherein the molten metal is an alloy in which aluminum predominates and the mixture includes magnesium and one of the group of substances consisting of soda ash and sodium fluoride.

EDITH VAIL DAVIES,
*Executrix of the Estate of Alfred H. Davies, Deceased.*